US011340016B2

(12) United States Patent
O'Hare

(10) Patent No.: US 11,340,016 B2
(45) Date of Patent: May 24, 2022

(54) GRAIN AERATION SYSTEM

(71) Applicant: GO Technologies Ltd., Kitscoty (CA)

(72) Inventor: Greg A. O'Hare, Kitscoty (CA)

(73) Assignee: GO Technologies Ltd., Kitscoty (CA)

( * ) Notice: Subject to any disclaimer, the term of this patent is extended or adjusted under 35 U.S.C. 154(b) by 0 days.

(21) Appl. No.: 17/088,782

(22) Filed: Nov. 4, 2020

(65) Prior Publication Data
US 2021/0325111 A1 Oct. 21, 2021

(30) Foreign Application Priority Data

Apr. 21, 2020 (CA) ................................ CA 3078743
Oct. 6, 2020 (CA) ................................ CA 3095397

(51) Int. Cl.
*F26B 17/14* (2006.01)
*A01F 25/22* (2006.01)
*F26B 9/10* (2006.01)

(52) U.S. Cl.
CPC .............. *F26B 17/14* (2013.01); *A01F 25/22* (2013.01); *F26B 9/103* (2013.01); *F26B 2200/06* (2013.01)

(58) Field of Classification Search
CPC ...... F26B 9/103; F26B 17/14; F26B 2200/06; A01F 25/08; A01F 25/22
USPC ............................ 34/168, 174; 454/175, 177
See application file for complete search history.

(56) References Cited

U.S. PATENT DOCUMENTS

| 2,126,107 | A | * | 8/1938 | Gordon | B65D 88/742 454/177 |
| 2,591,173 | A | * | 4/1952 | Marken | F26B 17/124 34/174 |
| 2,704,501 | A | * | 3/1955 | Rysdon | B65D 88/742 454/175 |
| 3,966,533 | A | * | 6/1976 | Goldsworthy | E04H 7/02 156/379.8 |
| 6,209,223 | B1 | * | 4/2001 | Dinh | F26B 21/001 34/86 |
| 8,677,648 | B2 | | 3/2014 | Schreiner | |
| 8,720,079 | B2 | * | 5/2014 | Neufeld | F26B 17/1425 34/174 |
| 10,473,394 | B2 | | 11/2019 | Comte | |

(Continued)

OTHER PUBLICATIONS

Downloaded from www.grainguard.com: Brochure from Grain Guard: Aeration Systems: The Next Generation Rocket;Mar. 2020; p. 1-6.

(Continued)

*Primary Examiner* — Jessica Yuen
(74) *Attorney, Agent, or Firm* — Colby Nipper PLLC

(57) ABSTRACT

There is a grain aeration system for a grain bin. The system includes a gas entry duct configured to receive gas and a gas distribution pipe extending upwardly from the gas entry duct and having a height. The gas entry duct extends along a base of the grain bin. The gas distribution pipe includes a permeable section and an impermeable section. The permeable section includes a plurality of perforations. The permeable section is above the impermeable section. There is also a grain bin, having a surrounding wall and roof. There is a gas entry duct extending from outside the surrounding wall to inside the surrounding wall and a gas distribution pipe extending upward from the gas entry duct. The gas distribution pipe has a permeable section above an impermeable section.

20 Claims, 12 Drawing Sheets

(56) References Cited

U.S. PATENT DOCUMENTS

2011/0183597 A1    7/2011   Schreiner

OTHER PUBLICATIONS

Downloaded from www.gatcomfg.com: Brochure from Gatco Manufacturing: 3 in 1 Aeration: Drying, Cooling & Natural Convection; Mar. 2020; p. 1-8.

* cited by examiner

US 11,340,016 B2

GRAIN AERATION SYSTEM

PRIORITY

This application claims the benefit of Canadian Patent Application No. 3,095,397, filed Apr. 21, 2020, and claims the benefit of Canadian Patent Application No. 3,095,397, filed Oct. 6, 2020, the disclosures of which are incorporated by reference herein in their entireties.

TECHNICAL FIELD

Grain aeration system.

BACKGROUND

Reducing moisture in stored grain is important for grain quality, safety and storage. Grain aeration systems are used to dry grain within a grain bin. Some systems include tubes and other heat/air distribution systems that heat grain from the bottom or only the lowermost section of a grain bin. This causes overdrying of the grain at the bottom of the bin and creates a dry line above which moisture is not removed or insufficiently removed from the grain. Grain above the dry line may remain at an initial grain moisture similar to the initial seed moisture, which may be in the range of 14 to 20 percent moisture content depending on the type of grain. Depending on the type of grain, moisture content below 10 percent may be necessary to ensure no spoilage of grain for storage for months at a time. Some known grain aeration systems do not adequately heat or add air to the grain in the top of a grain bin while overheating the grain at or near the bottom.

SUMMARY

There is provided in one embodiment a grain aeration system for a grain bin. The system comprises a gas entry duct configured to receive gas, the gas entry duct extending along a base of the grain bin and a gas distribution pipe extending upwardly from the gas entry duct and having a height. The gas distribution pipe comprises a permeable section in an upper portion of the gas distribution pipe. The permeable section comprising a plurality of perforations.

In various embodiments, there may be included any one or more of the following features: the gas distribution pipe having an impermeable section and the impermeable section being below the permeable section, a heater to supply heated gas to the gas entry duct; the impermeable section extends from the gas entry duct to a distance more than half the height of the gas distribution pipe; the gas distribution pipe comprises a vertical tube; the impermeable section extends from the gas entry duct to a distance more than forty percent of the height of the gas distribution pipe; the plurality of perforations extend to a top of the gas distribution pipe; a cone deflector is mounted above the permeable section; at least three guy wires attached to the gas distribution pipe; the heater is a blower; the blower further comprises: a gas intake, a fan configured to draw air from the intake, an external burner, a heat exchanger in fluid connection with the external burner, the heat exchanger being downstream of the intake, and an outlet downstream of the heat exchange, the outlet being connected to the gas entry duct; the gas entry duct comprises a horizontal tube; a gas flow redirector connected to a base of the gas distribution pipe to direct gas from the gas entry duct into the gas distribution pipe; and the gas flow redirector is a gas flow scoop.

There is provided in one embodiment a grain bin, comprising a surrounding wall and roof, a gas entry duct extending from outside the surrounding wall to inside the surrounding wall and a gas distribution pipe extending upward from the gas entry duct, the gas distribution pipe having a permeable section in an upper portion of the gas distribution pipe.

In various embodiments, there may be included any one or more of the following features: the gas distribution pipe having an impermeable section below the permeable section, a heater placed to heat gas that passes through the gas entry duct or gas distribution pipe; the roof is conical with an apex and the gas distribution pipe is inline with the apex; the permeable section is shorter than the impermeable section; and the gas is air sourced from outside the surrounding wall.

These and other aspects of the system and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
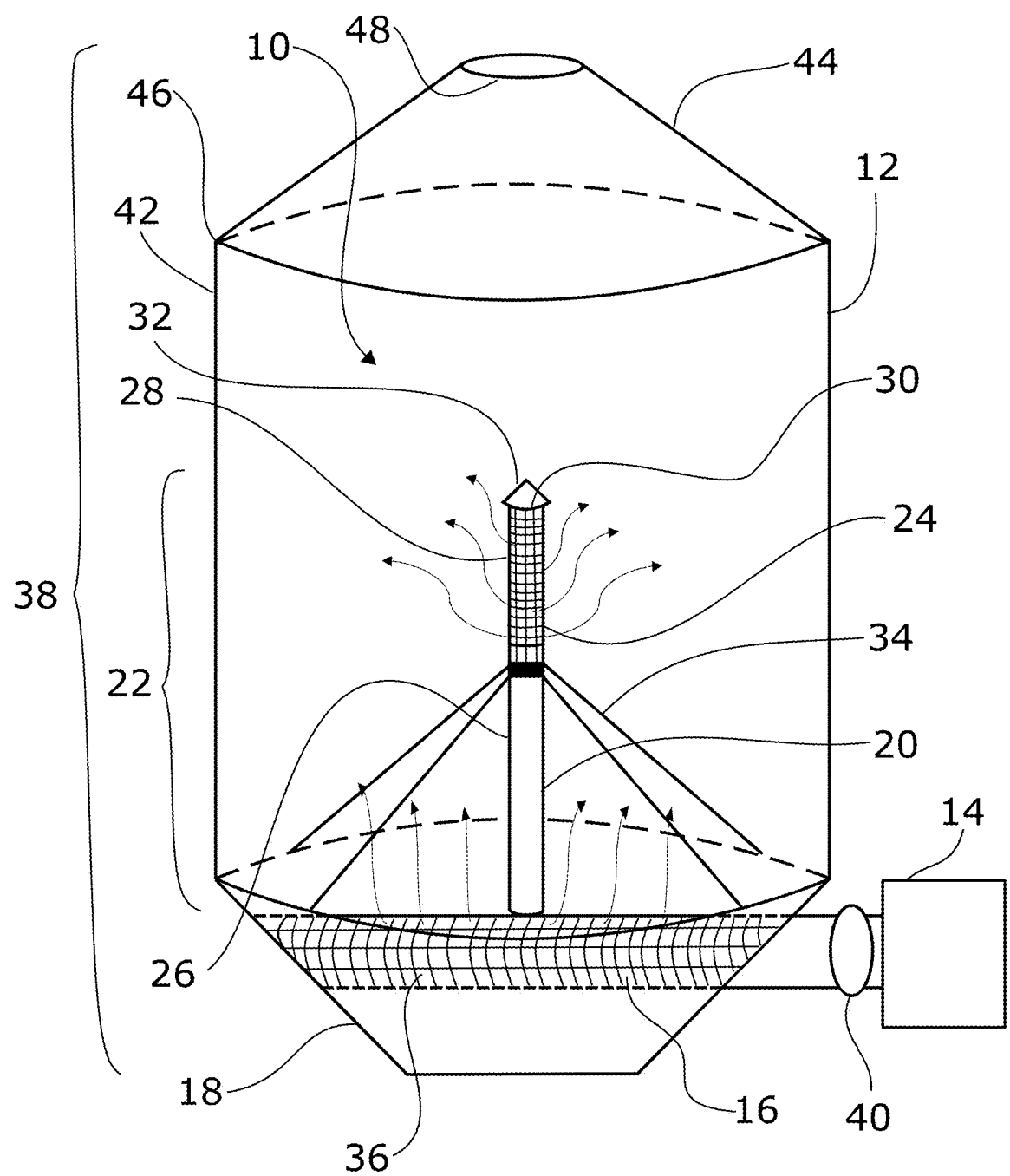
FIG. 1 is a side schematic view of an embodiment of a grain aeration system.
Figure 3:
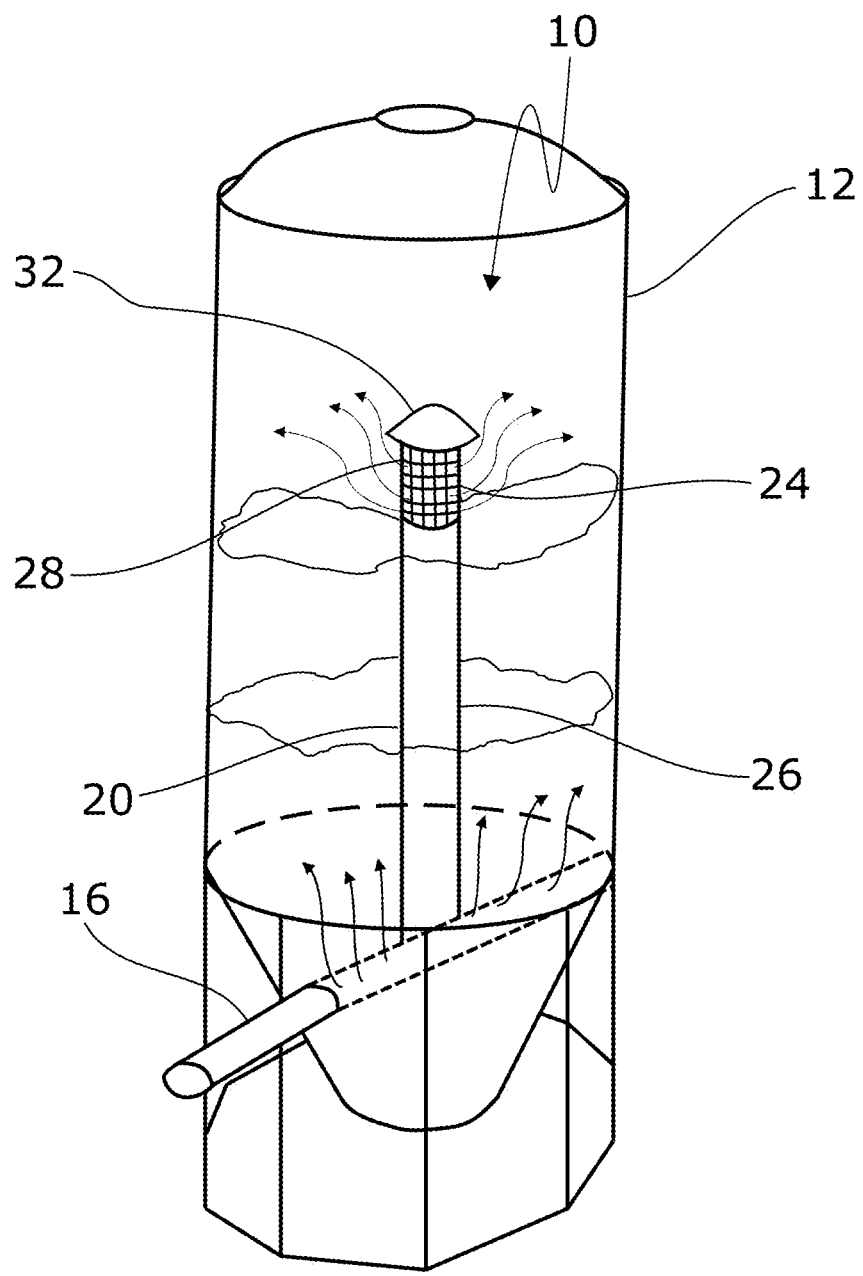
FIG. 3 is a side schematic view of another embodiment of a grain aeration system.
Figure 4:
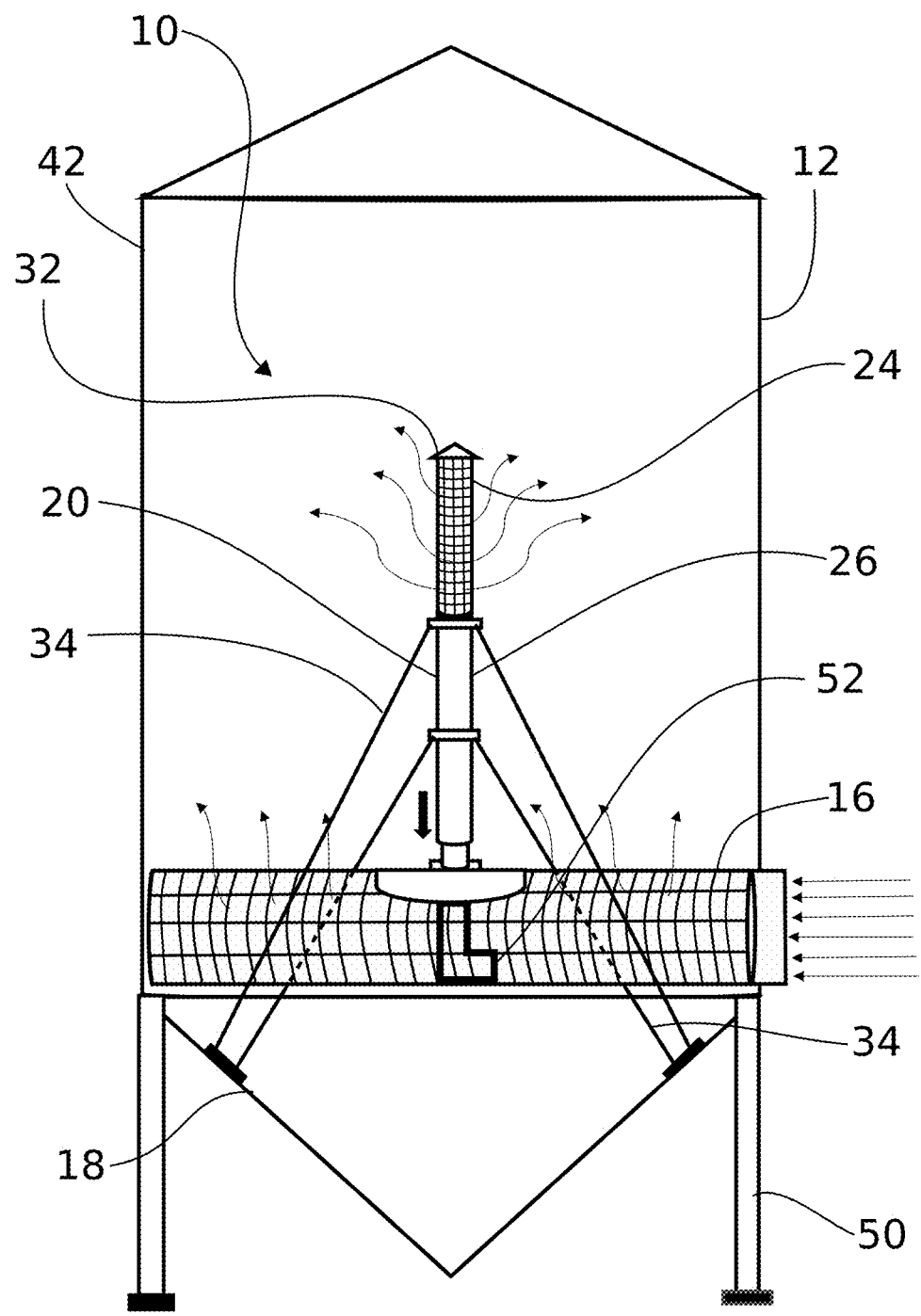
FIG. 4 is a side schematic view of another embodiment of a grain aeration system.

In FIGS. 1, 3 and 4 there are disclosed embodiments of a grain aeration system 10 for a grain bin 12. The grain aeration system may be called the "GO Tech Air Missile"™.

The grain bin 12 includes a surrounding wall 42 and roof 44. A gas entry duct 16 extends from outside the surrounding wall 42 to inside the surrounding wall and a gas distribution pipe 20 extends upward from the gas entry duct 16. The gas distribution pipe 20 has a permeable section 24 in an upper portion of the gas distribution pipe. As shown in FIG. 1, the permeable section 24 is above an impermeable section 26.

Although in FIG. 1, the impermeable section 26 is shown as allowing no gas flow through the gas distribution pipe 20, the system will operate even if there is some, but reduced, flow through a lower portion of the gas distribution pipe 20 as compared to the upper permeable section.

Figure 2:
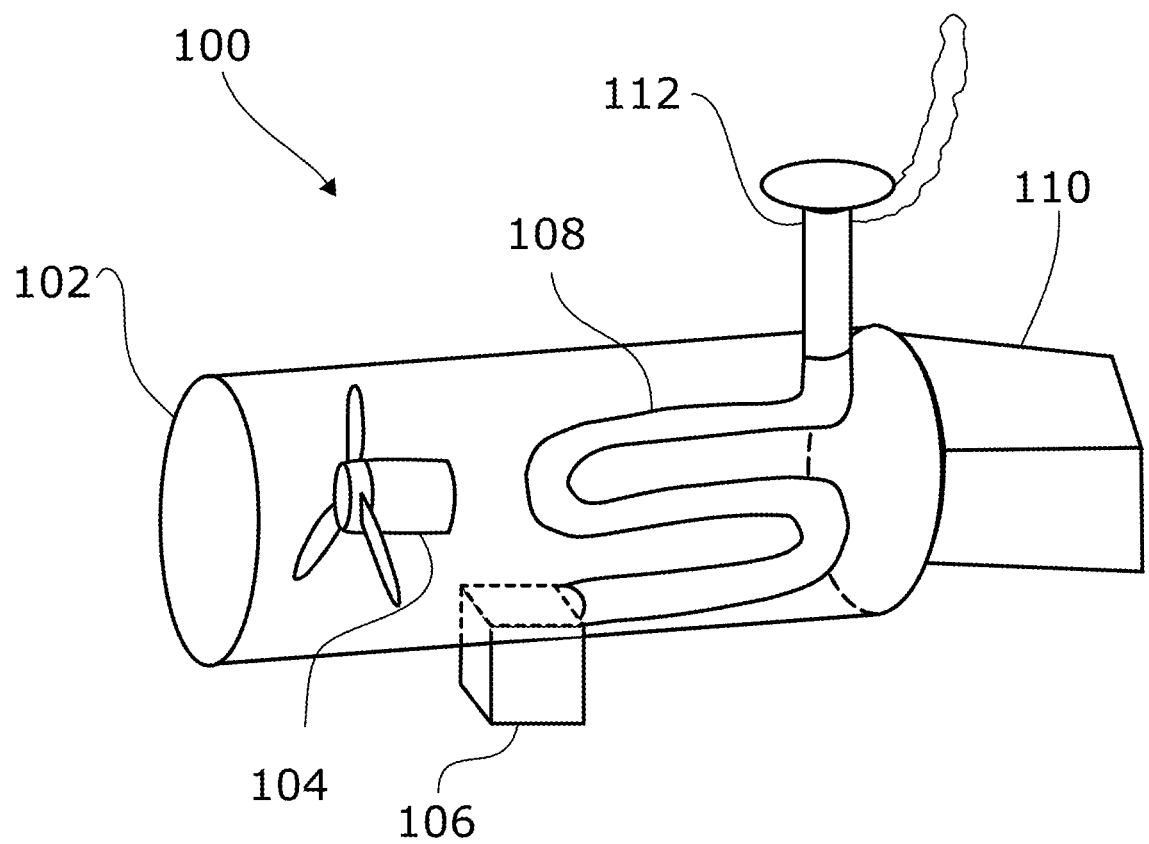
FIG. 2 is a side schematic view of a blower for a grain aeration system.

There is a heater 14 exterior to the grain bin 12. The heater 14 is placed to heat gas that passes through the gas entry duct 16 or gas distribution pipe 20. The heater may be, for example, a standard blower or a blower 100 as shown in FIG. 2. Any suitable source of heated gas may be used. Separate heaters may be used for the gas entry duct 16 and the gas distribution pipe 20. In embodiment shown in FIGS. 1, 3 and 4, the gas is air sourced from outside the surrounding wall. Other sources of gas may also be used. The heater could be inline in either the gas entry duct or the gas distribution pipe. Heated gas maybe also be provided by passive solar heat, including, for example, a lens placed over the gas distribution pipe outside the bin.

The roof 44 is conical with an apex 48 and the gas distribution pipe 20 is inline with the apex 48. As shown in FIG. 1, the permeable section 24 is shorter than the impermeable section 26. The gas distribution pipe 20 has a top 30 and the surrounding wall has an upper edge 46.

The gas entry duct 16 is configured to receive heated gas from the heater 14. The gas entry duct 16 extends along a base 18 of the grain bin 12. The gas entry duct 16 is a horizontal tube that extends along the full width of the grain bin 12 and includes a plurality of perforations 36. The perforations 36 may extend along the entire length of the gas entry duct 16. The gas entry duct 16 may extend from one side of the grain bin to the other or may extend only across a portion of the grain bin. Although the gas entry duct 16 is shown as a single horizontal tube, the gas entry duct may be one of several tubes or may be a tube with various curves and twists. The gas entry duct 16 does not need to have a uniform height along its length. The gas entry duct may have any configuration or shape so long as it supplies sufficient gas to dry grain in the lower portion of the grain bin. If the ambient air is over 15 degrees Celsius, a heater may not be needed, and the aeration fans can be run without a heat source to dry grain.

The gas distribution pipe 20 extends upwardly from the gas entry duct 16. The gas distribution pipe 20 is a vertical tube and has a height 22. The permeable section 24 has a plurality of perforations 28. The height 22 of the gas distribution pipe may be in the range of 40 to 80 percent of a height 38 of the grain bin. The gas distribution pipe may have a variety of diameters. Preferably, the diameter of the gas distribution pipe will be no less than four inches. The gas distribution pipe 20 does not need to be precisely vertical and can have various curves and twists. The gas distribution pipe 20 may have a variety of shapes and orientations so long as it supplies sufficient heat to dry grain in the upper portion of the grain bin. The gas distribution pipe may be one of a plurality of tubes that extend upwardly within the grain bin. The heated gas will rise in the bin, and so the permeable section 24 of the gas distribution pipe 20 is preferably placed in the middle or upper-middle portion of the bin.

The impermeable section 26 may extend from the gas entry duct 16 to a distance more than half the height 22 of the gas distribution pipe. The impermeable section 26 may extend more than forty percent of the height of the gas distribution pipe 20. As shown in FIG. 1, the impermeable section 26 extends from the gas entry duct 16 to approximately sixty percent of the height 22 of the gas distribution pipe. The plurality of perforations 28 extend from approximately sixty percent of the height 22 of the gas distribution pipe to the top 30 of the gas distribution pipe. The impermeable section 26 may not extend to the base of the gas distribution pipe 20. The base distribution pipe 20 may include a small section of perforations near the base of the gas distribution pipe, so long as the impermeable section 26 of the gas distribution pipe provides a vertical section where heated gas is not introduced into the grain bin below the permeable section 24. In contrast, a vertical tube having continuous and equally-sized perforations from the base of the grain bin to an upper-level in the bin could cause overdrying of the grain below a certain height and insufficient drying about that height.

A cone deflector 32 is mounted above the permeable section of the gas distribution pipe to deflect grain that is supplied into the grain bin. The cone deflector 32 may extend, for example, half an inch beyond the outer diameter of the bin to take the pressure off of the tube when grain is being loaded and unloaded.

The gas distribution pipe may be supported by at least three guy wires 34 attached to the gas distribution pipe 20. As shown in FIG. 1, there are four guy wires 34. Preferably, there will be guy wires 34 attached to the top section (FIG. 4) and in the middle of the gas distribution pipe, with a minimum of three wires at each location. Alternatively, the gas distribution pipe may be supported at the base of the bin using at least three support rods (FIGS. 11 and 12), which could extend up to the base of the permeable section of the gas distribution pipe. Various designs of supports may be used so long as the supports ensure that the gas distribution pipe does not collapse during normal operation. As shown in FIG. 4, the grain bin 12 itself may be supported on supports 50.

As shown in FIG. 4, there is a gas flow redirector, such a gas flow scoop 52, at the base of the gas distribution pipe 20 to grab gas, such as air, from the gas entry duct 16 to redirect it towards gas distribution pipe 20. The gas flow redirector increases the distribution of gas into the gas distribution pipe 20. Various designs of gas flow redirector may be used to increase the distribution of gas into the gas distribution pipe.

In some embodiments, by providing a gas distribution pipe 20 that injects gas from an upper portion of the tube, but not the lower portion, more equal drying may be achieved within the bin. In some current drying systems, heating may be performed only from the base of the grain bin. This causes substantial drying in the lower portion of the grain bin, but may leave inadequate drying in the upper portion of the bin. Similarly, even if systems that use vertical tubes were used that were equally perforated along their full heights, those tubes would still heat unevenly by heating the lower portions of the grain bin more than the upper portions. By having the impermeable section of solid pipe extend, for example, two thirds of the way up the gas distribution pipe, gas flow is added to the top of the bin to push the excessive moisture out the top and stop the overdrying at the bottom.

As shown in FIG. 2, there is a blower 100 having a gas intake 102, a fan 104 configured to draw gas, such as air, from the intake 102, an external burner 106, a heat exchanger 108 in fluid connection with the external burner 106 and an outlet 110 downstream of the heat exchanger 108. During operation, the outlet 110 of the blower is connected to an inlet 40 (FIG. 1) of the gas entry duct. The blower 100 draws gas into the inlet 102 by the operation of the fan 104 within the blower and pushes the gas to the heat exchanger 108, which is downstream of the intake 102. Heated gas that passes the heat exchange 108 is pushed out the outlet 110 of the blower 100. The external burner 106 may alternatively be placed within the blower 100 so long as exhaust does not enter the stream of heated gas that goes into the grain bin. 100361 By sending gas past heat exchanger 108 to heat the gas up, the burner 106 and heat exchanger 108 vent to the outside of the gas stream through an exhaust 112. This is different from standard burner designs which may send exhaust gas directly into the grain bin with the heated gas. By removing burner exhaust from the stream of heated gas entering the grain bin, all the water vapour from combustion is kept out of the grain, thus allowing the grain to dry faster.

FIG. 3 shows another embodiment of a grain bin aeration system 10. For simplicity, support structures such as guy wires are not shown. As compared to the embodiment shown in FIG. 1, the permeable section 24 of the gas distribution pipe 20 has a shorter height. The permeable section 24 has a height less than a third of the full height of the impermeable section 26. By providing the permeable section 24 in the middle to upper half of the grain bin, more even drying of the grain may be provided as compared to traditional systems. By adding extra gas at the top of the grain bin, rather than along the entire length of the gas distribution pipe, moisture is pushed out of the entire bin. In some embodiments, this allows for more even drying throughout the bin.

Figure 5:
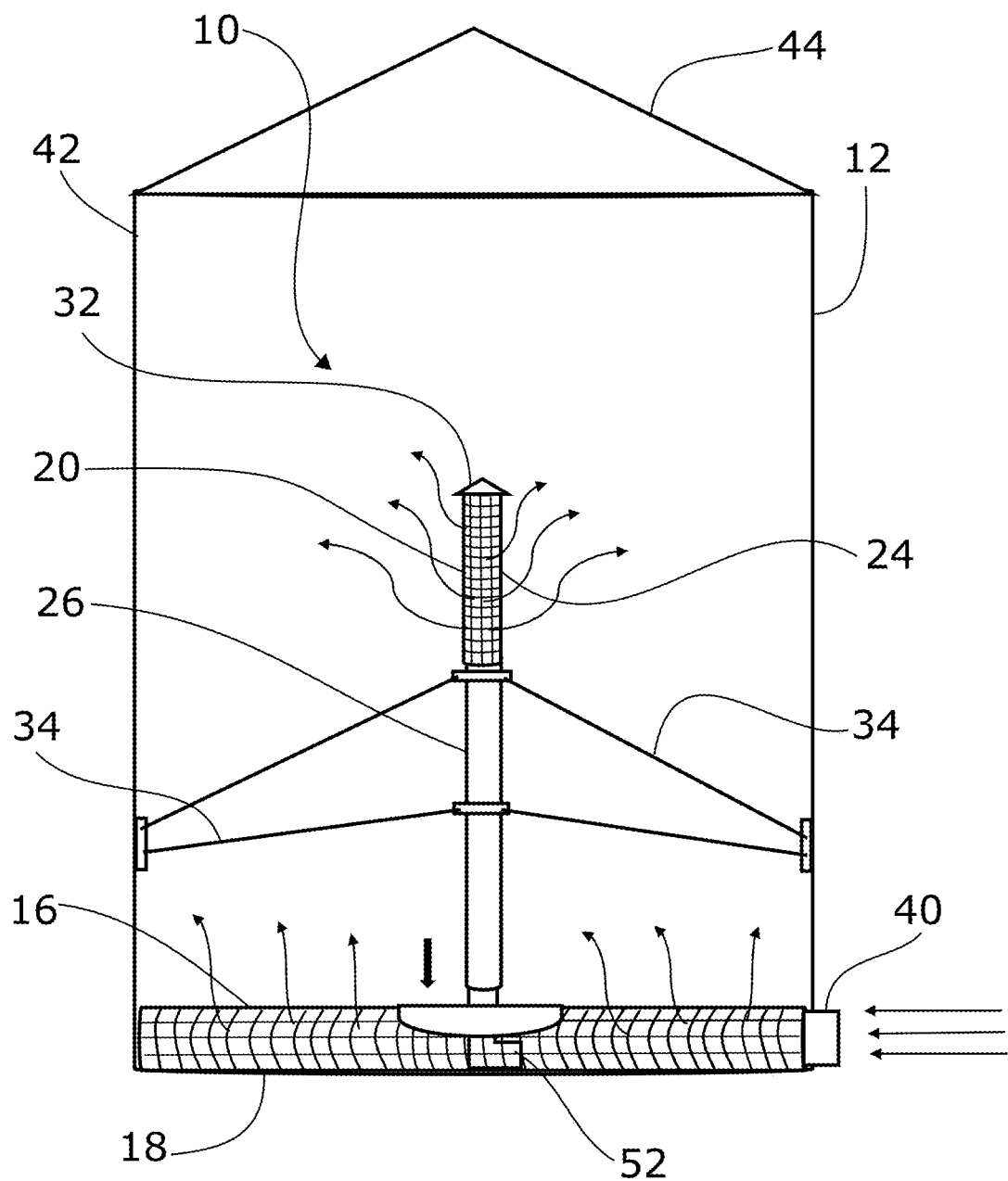
FIG. 5 is a side schematic view of an embodiment of a grain aeration system in a flat bottom bin.

FIG. 5 shows an embodiment of grain aeration system 10 with a grain bin 12 having a flat bottom. In this embodiment, the guy wires 34 are attached to the walls 42 of the grain bin 12. The gas entry duct 16 is placed directly along the flat base 18 of the grain bin 12.

In some bigger flat bottom bins, the grain aeration system may include multiple gas distribution pipes extending upwardly within the bin. The systems may include multiple gas entry ducts extending from outside the surrounding wall to inside the surrounding wall and multiple gas distribution pipes extending upward from each of the gas entry ducts. The gas distribution pipes may be spaced within the grain bin to allow for maximum drying. In other embodiments only one gas entry duct may be used that is connected to and supplies gas, such as air, to multiple gas distribution pipes.

Figure 6:
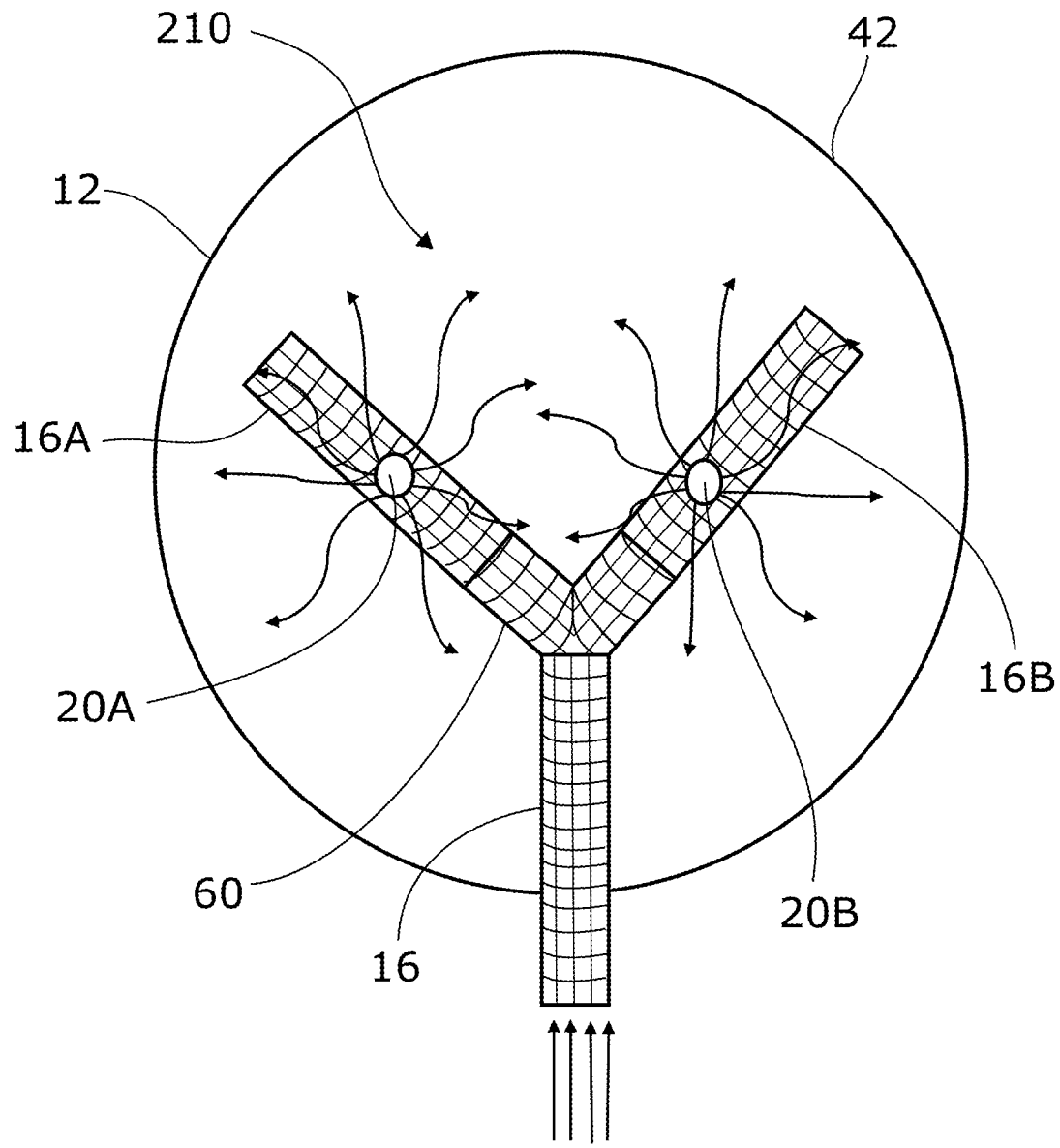
FIG. 6 is a top schematic view of an embodiment of a grain aeration system with two gas distribution pipes in a large flat bottom bin.

FIG. 6 shows an embodiment of a grain aeration system 210 having multiple gas distribution pipes 20A, 20B and a gas entry duct 16 having a single exterior inlet. The gas entry duct 16 is split by a divider 60 into two gas entry duct sections 16A, 16B. Each of the gas entry duct sections 16A and 16B has the corresponding gas distribution pipe 20A and 20B, respectively, extending upwardly from the corresponding gas entry duct section. Each of the gas distribution pipes 20A and 20B may have a design the same as one of the gas distribution pipes 20 shown in the embodiments of FIG. 1, 3 or 4. The specific design and orientation of the gas distribution pipes 20A and 20B and the gas entry ducts may be chosen based on the size and orientation of the grain bin, the type of grain being dried, exterior air temperature, energy efficiency and other relevant factors. Each of the gas entry duct sections 16A and 16B are perforated. The portion of the gas entry duct 16 from the inlet to the divider 60 may also be perforated as shown in FIG. 6. The placement of the perforations of the gas entry duct 16 may be selected based on various factors such as the size and orientation of the bin, the type of grain being dried, exterior air temperature and other relevant factors.

Figure 7:
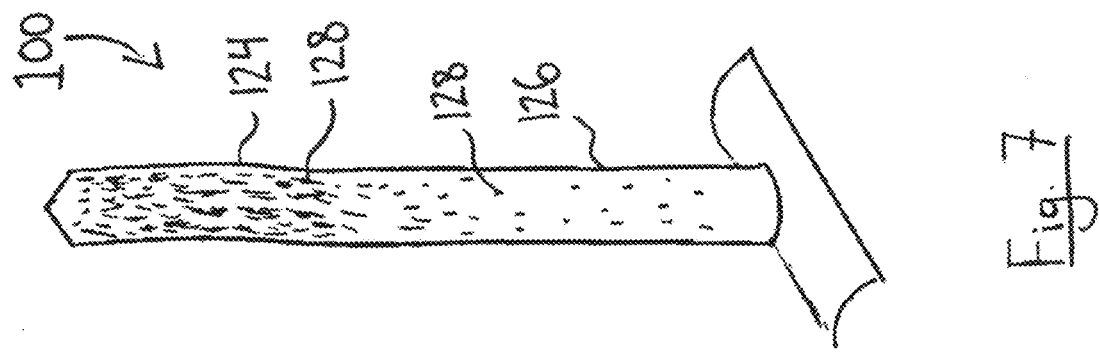
FIG. 7 is a side schematic view of an embodiment of a gas distribution pipe having openings in a lower portion of the pipe.

As shown in FIG. 7, rather than having a lower impermeable section 26 as shown in FIG. 1, there may be some perforations extending in a lower portion 126 of a gas distribution pipe 100 so long as the perforations are smaller or fewer than in a permeable section 124 in an upper portion so as to allow reduced flow in the lower section. The airflow through the permeable section 124 in an upper portion of the gas distribution pipe is preferably between 10 and 40 percent of the airflow into the grain bin while almost all of the remainder moves through the gas entry duct 16 (FIG. 1). The flow through the lower portion 126 of the gas distribution pipe may be minimal or the lower portion may be fully impermeable. As shown in FIG. 7, the perforations 128 extend from the gas entry duct to the top of the gas distribution pipe, but are higher in number and/or size in the permeable section 124 of the gas distribution pipe. In some embodiments, there is a prorated design in which the openings in the gas distribution pipe get larger as the height is increased. The size of the holes may start small on the lower portions and get larger going up to the distribution pipe or there may be more holes the higher up the distribution pipe. So long as a balance can be provided between drying the grain in the upper portion of the bin by the permeable section 124 and the grain in the lower portion of the bin provided by the lower portion 124 and gas entry duct, the location and sizes of openings in the gas distribution pipe and gas entry duct may be rearranged. The lower section between the permeable upper section and the gas entry duct can have no perforations, or could have perforations, depending on the corresponding airflow between the gas entry duct and the upper section of the gas distribution pipe. In some embodiments, it may be possible to have more extensive perforations having more gas flow in the lower section of the gas distribution pipe if there less extensive perforations having less gas flow in the gas entry duct.

In some embodiments there may be multiple sections of permeable sections at different heights along the gas distribution pipe. For example, the gas distribution pipe may have in addition to a permeable section at an upper portion of the gas distribution pipe, an additional gas permeable section in the middle part of the gas distribution pipe, for example, for bins taller than 20 feet.

Figure 10:
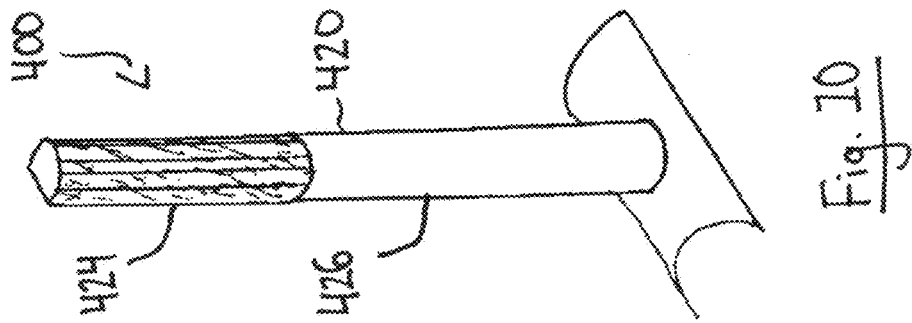
FIGS. 8-10 are side schematic views of embodiments of gas distribution pipes having different shapes.
Figure 9:
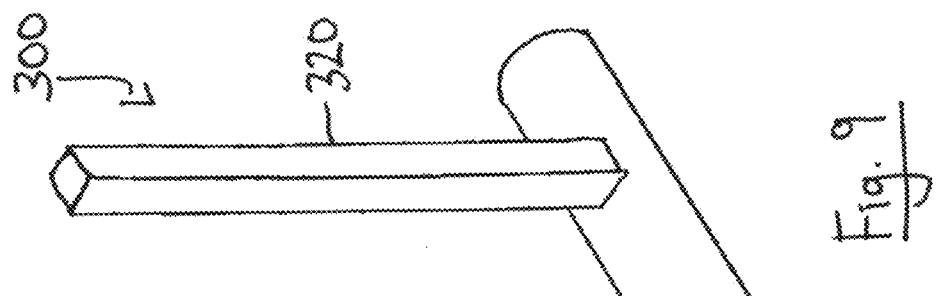
Figure 8:
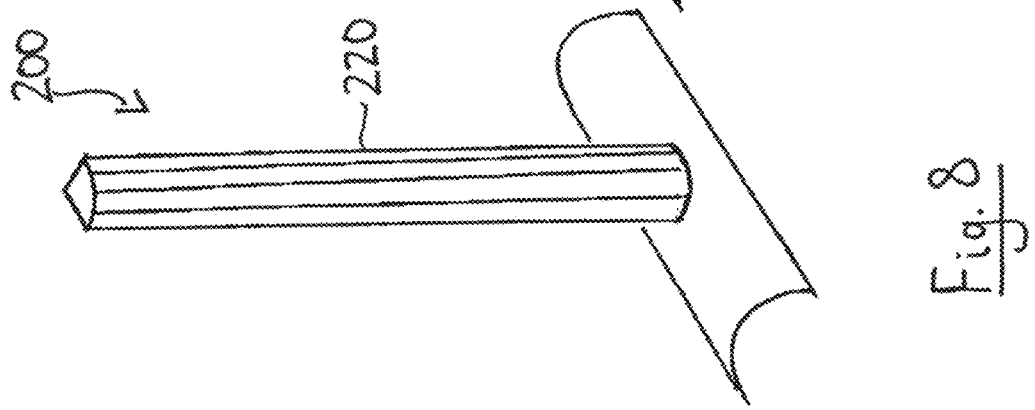

FIG. 8 shows a gas distribution pipe 200 having a polygonal cross-section 220. Various different shapes of gas distribution pipes may be used. As shown in FIG. 9, a gas distribution pipe 300 may have a square cross-section 320. As shown in FIG. 10, different sections of a gas distribution pipe 400 may have different shapes. A lower portion of a gas distribution pipe, for example, an impermeable section 426 may be cylindrical 420 whereas an upper portion of a gas distribution pipe, for example, a permeable section 424 may have a polygonal cross-section.

Figure 11:
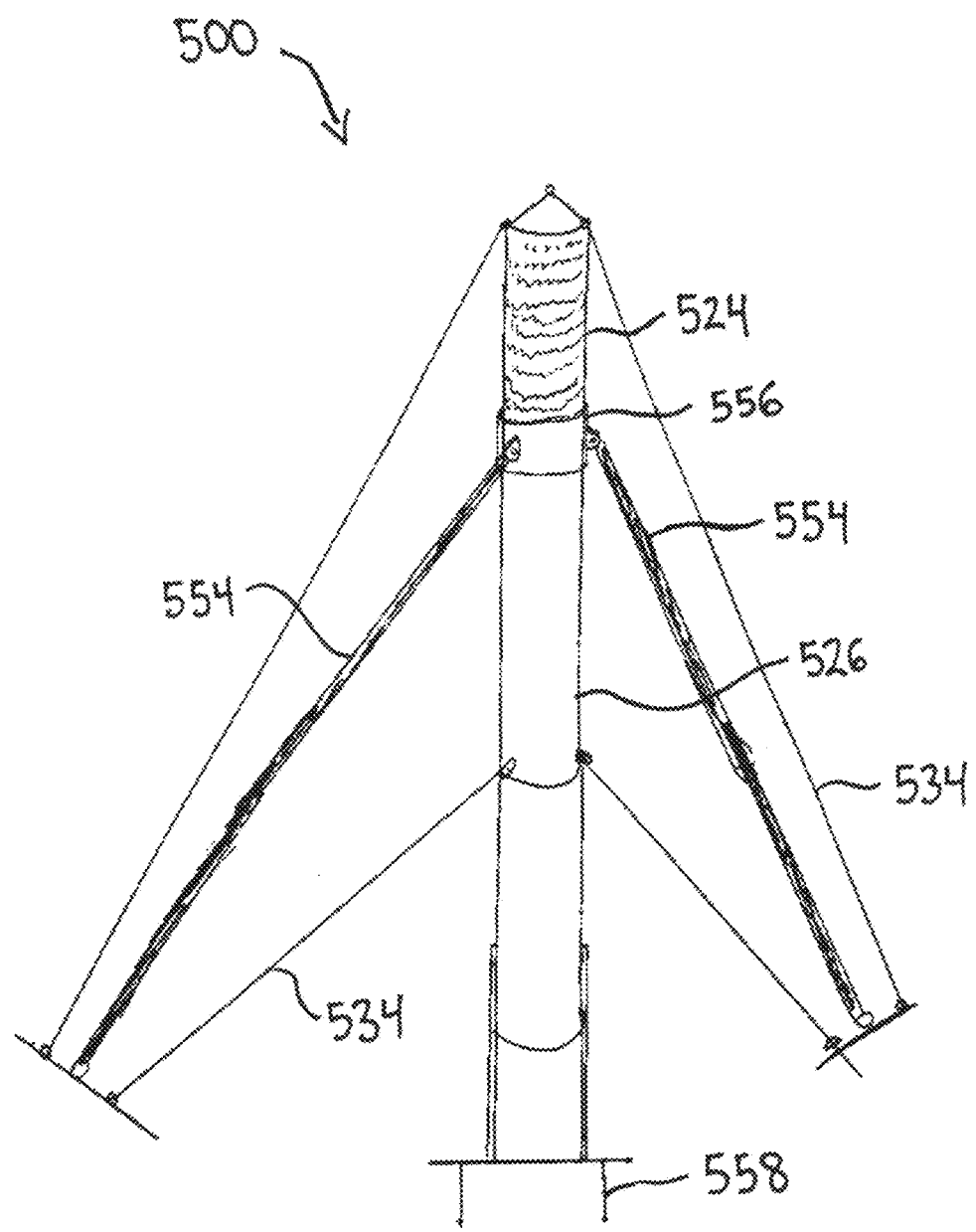
FIG. 11 is a side schematic view of a gas distribution pipe mounted on a support plate.
Figure 12:
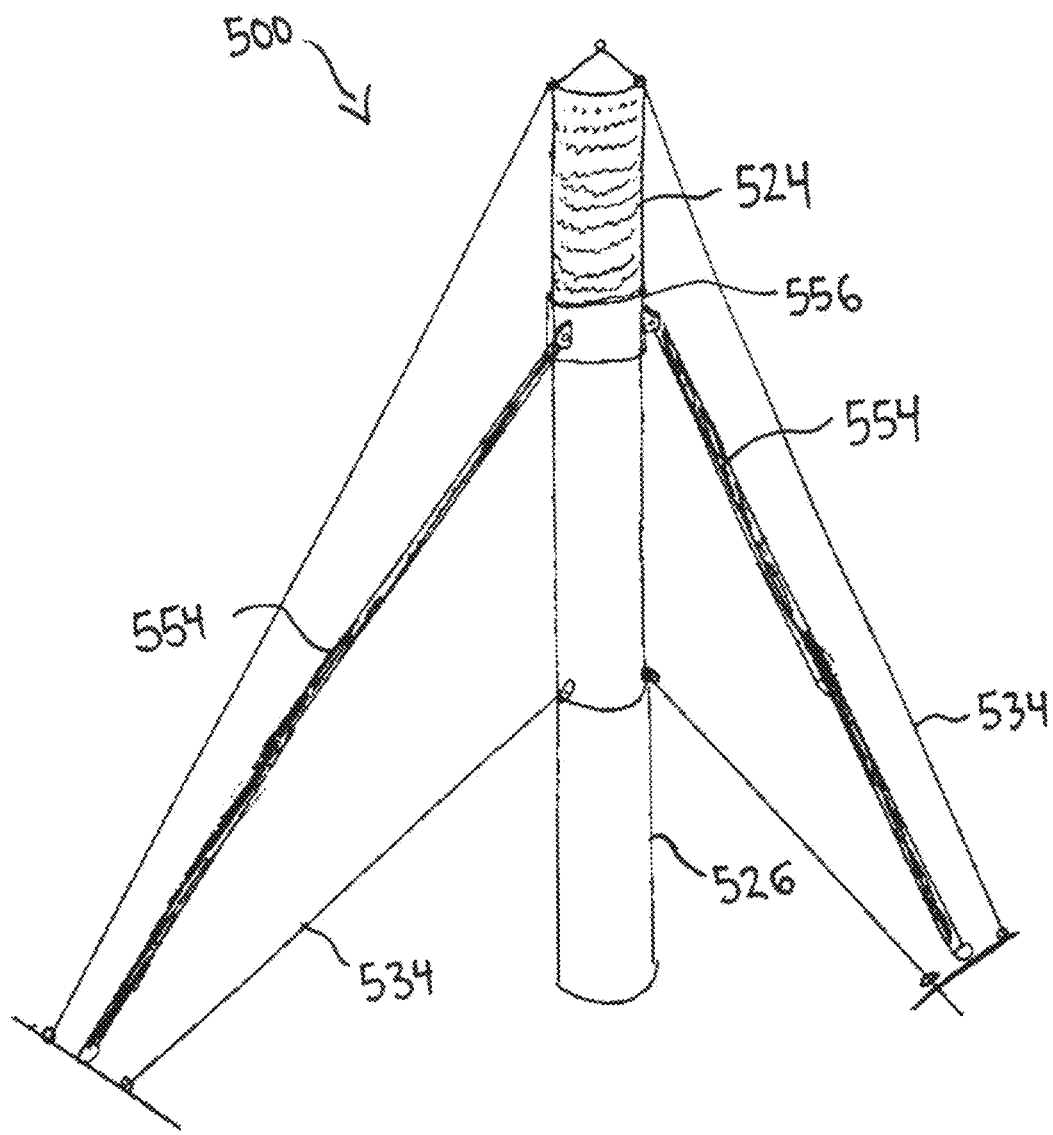
FIG. 12 is a side schematic view of a gas distribution pipe having support rods and a collar.
Figure 13:
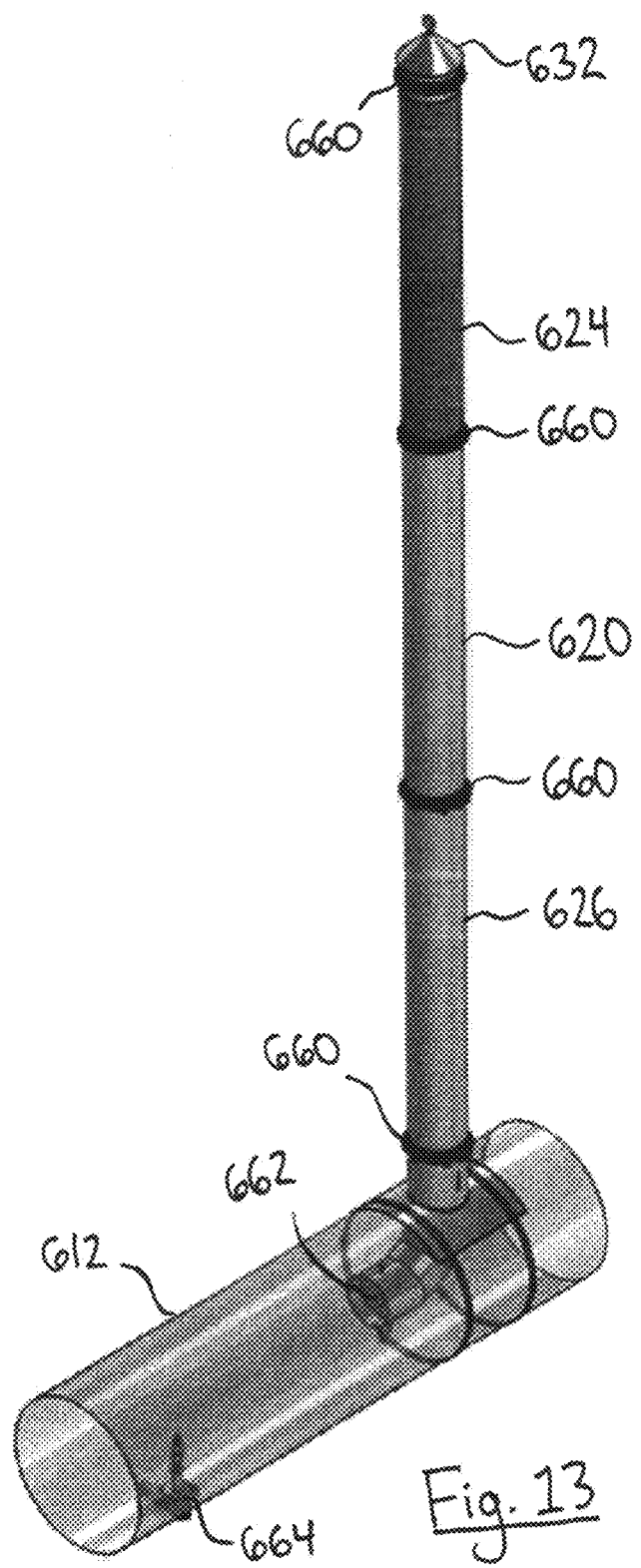
FIG. 13 is an isometric side schematic view of a gas distribution pipe and a gas entry duct with a dampener.

FIGS. 11 and 12 show a gas distribution pipe 500 having a lower impermeable section 526 and an upper permeable section 524. A number of rods 554 provide middle support in addition to guide wires 534 and connect to a collar 556. The collar 556 may sit between the permeable and impermeable sections as shown, or may be placed in other locations along the gas distribution pipe. The collar 556 may have a loose fit or may be tightened on. As shown in FIG. 11, the gas distribution pipe may be mounted on a support plate 558 which is fixed to bin supports (not shown).

FIGS. 13-16 show a gas distribution pipe 620 and a gas entry duct 612 where the gas entry duct includes a dampener 662 for changing the amount of gas flow into the gas distribution pipe. The gas distribution pipe 620 has a permeable section 624 above an impermeable section 626 and the gas distribution pipe 620 is a series of pipes joined together and there are cone deflectors 660 between each joint. There is also a top cone deflector 632 mounted above the permeable section 624.

Figure 14:
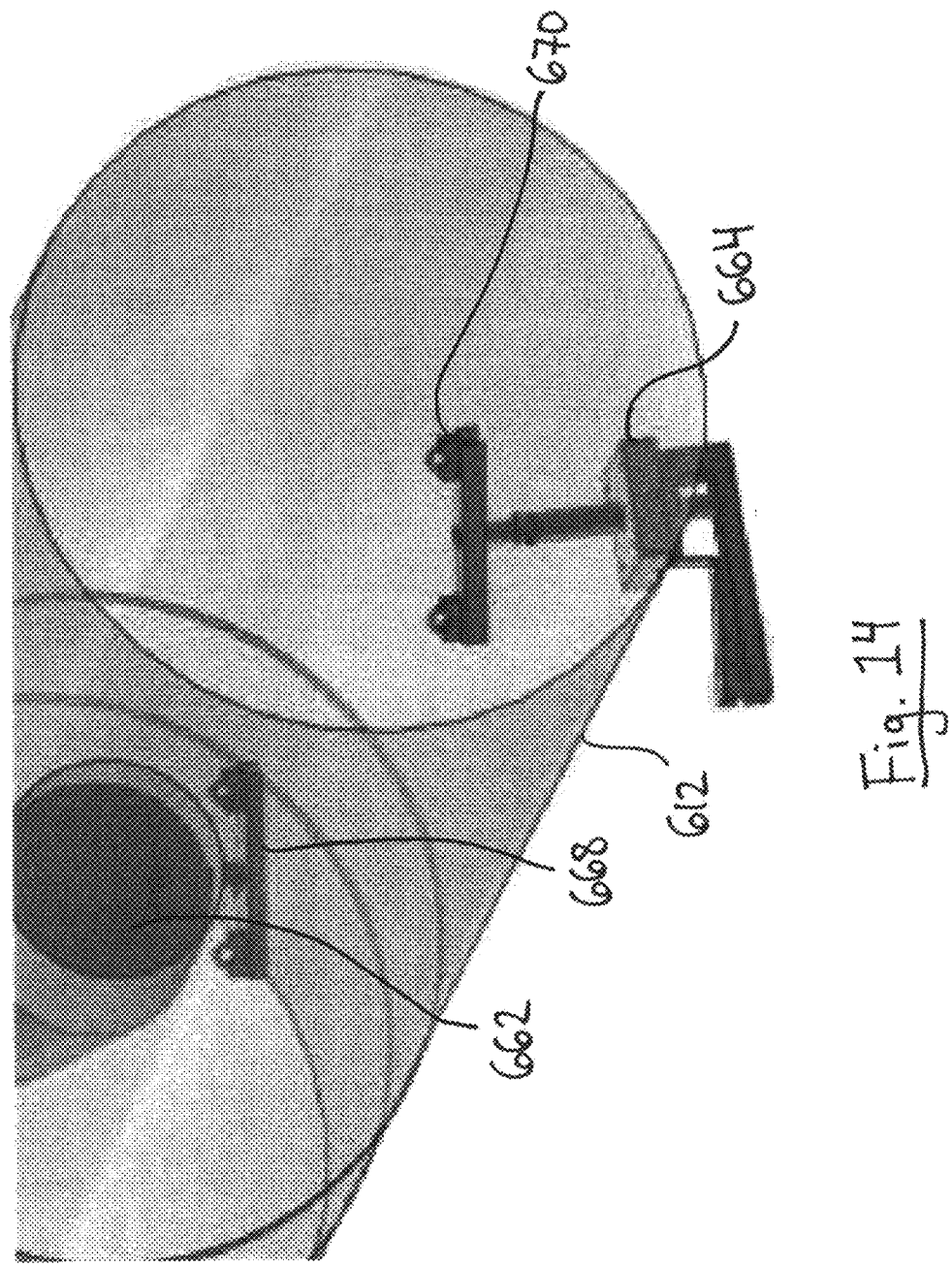
FIG. 14 is an isometric side schematic view of an actuator for opening and closing the dampener in FIG. 13.

As shown in FIG. 14, the dampener 662 may be actuated by a spring tensioned lever 664 which is connected to the dampener by corresponding arms 668 and 670 with rigid or tensioned connections (not shown) between them. Controlling the dampener provides for control of the amount of gas flow into the gas distribution pipe. Control of gas flow into the gas distribution pipe may be controlled in various ways including various designs of dampeners. In some embodiments, the dampener may be opened and closed by being actuated remotely.

Figure 15:
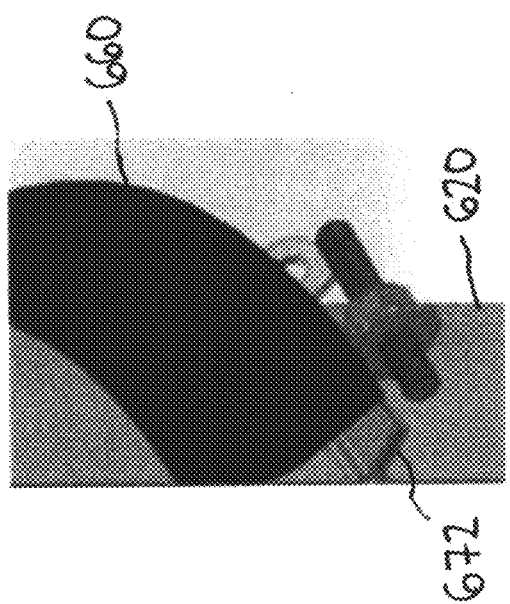
FIG. 15 is a close up cutaway side schematic view of cone deflector on a joint of a gas distribution pipe.
Figure 16:
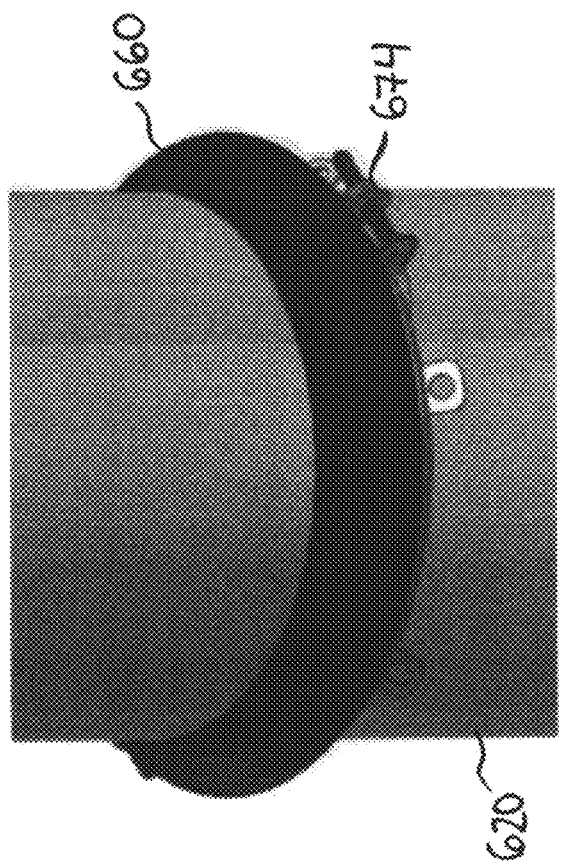
FIG. 16 is a side schematic view of the cone deflector on a joint of a gas distribution pipe of FIG. 15.

As shown in FIGS. 15 and 16, there are cone deflectors 660 between joints of the gas distribution pipe 620. The joints of pipe may be joined using a flange 672 and various attachment mechanisms 674.

Immaterial modifications may be made to the embodiments described here without departing from what is covered by the claims. For example, various different sizes, shapes and orientations of perforations are possible. Perforations do not need to be uniformly spaced on the permeable section of the gas distribution pipe. The term perforation is used to refer to any openings in the tube that allow heated gas to escape from the tube. A permeable section may have any structure as long as gas flow is permitted from within the pipe to outside of the pipe. For example, the permeable sections of the gas distribution pipe could include small sections of pipe that are both permeable and impermeable so long as the collective whole allows for gas flow into a nearby section of the grain bin. The gas distribution pipe and gas entry duct may be tubes having any shapes or design and do not need to be cylindrical in shape. The number, orientation and shape of gas entry ducts and gas distribution pipes may be chosen based on the size and orientation of the grain bin, the type of grain being dried, exterior air temperature, energy efficiency and other relevant factors, so long as beneficial distribution of drying of the grain within the bin may be achieved.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. A grain aeration system for a grain bin, the system comprising:
   a gas entry duct configured to receive gas, the gas entry duct being positioned in a lower part of the grain bin, the gas entry duct comprising a plurality of perforations; and
   a gas distribution pipe extending upwardly from the gas entry duct and having a height, the gas distribution pipe comprising:
   a permeable section in an upper portion of the gas distribution pipe, the permeable section comprising a plurality of perforations; and
   a lower section below the permeable section having reduced permeability as compared to the permeable section.

2. The grain aeration system of claim 1 in which the lower section further comprises an impermeable section.

3. The system of claim 1 further comprising a blower to supply heated gas to the gas entry duct.

4. The system of claim 3 further comprising a heater to heat gas supplied by the blower to the gas entry duct.

5. The system of claim 4 in which the blower further comprises:
   a gas intake;
   a fan configured to draw gas from the intake;
   an external burner;
   a heat exchanger in fluid connection with the external burner, the heat exchanger being downstream of the intake; and
   an outlet downstream of the heat exchanger, the outlet being connected to the gas entry duct.

6. The system of claim 1 in which the lower section extends from the gas entry duct to a distance more than forty percent the height of the gas distribution pipe.

7. The system of claim 6 in which the lower section extends from the gas entry duct to a distance more than half the height of the gas distribution pipe.

8. The system of claim 1 in which the gas distribution pipe comprises a vertical tube.

9. The system of claim 1 in which the plurality of perforations extend to a top of the gas distribution pipe.

10. The system of claim 1 further comprising a cone deflector mounted above the permeable section.

11. The system of claim 1 further comprising at least three guy wires attached to the gas distribution pipe.

12. The system of claim 1 in which the gas entry duct comprises a horizontal tube extending along a base of the grain bin.

13. The system of claim 1 further comprising a gas flow redirector connected to a base of the gas distribution pipe to direct gas from the gas entry duct into the gas distribution pipe.

14. The system of claim 13 in which the gas flow redirector is a gas flow scoop.

15. A grain bin, comprising a surrounding wall and roof, a gas entry duct extending from outside the surrounding wall to inside the surrounding wall in a lower part of the grain bin, the gas entry duct comprising a plurality of perforations and a gas distribution pipe extending upward from the gas entry duct, the gas distribution pipe having a permeable section in an upper portion of the gas distribution pipe and a lower section below the permeable section having reduced permeability as compared to the permeable section.

16. The grain bin of claim 15 in which the lower section further comprises an impermeable section.

17. The grain bin of claim 16 in which the permeable section is shorter than the impermeable section.

18. The grain bin of claim 15 further comprising a heater placed to heat gas that passes through the gas entry duct or gas distribution pipe.

19. The grain bin of claim 15 in which the roof is conical with an apex and the gas distribution pipe is inline with the apex.

20. The grain bin of claim 15 in which the gas is air sourced from outside the surrounding wall.

* * * * *